W. H. BOYLE.
Corn-Planter.
No. 47,614. Patented May 9, 1865.
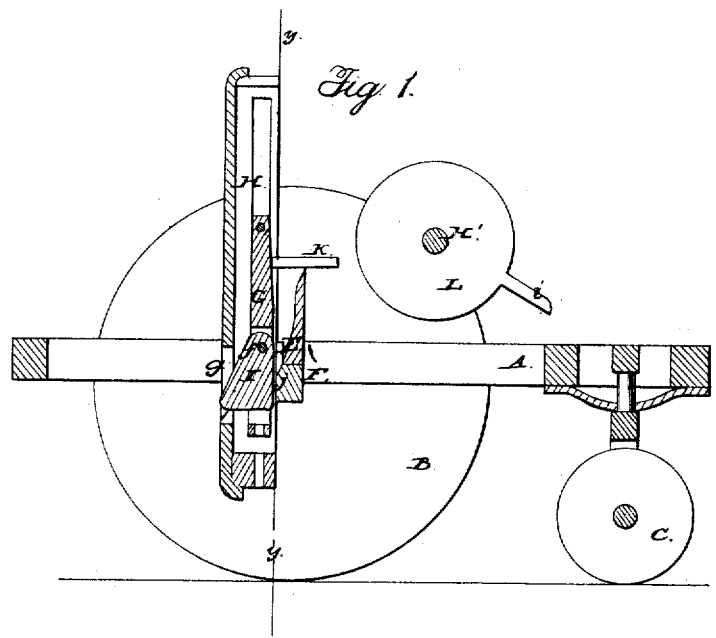
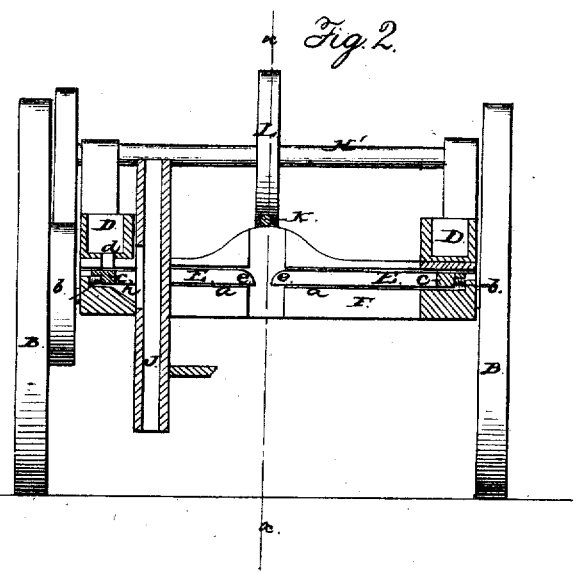
Witnesses: Inventor:

UNITED STATES PATENT OFFICE.

WILLIAM H. BOYLE, OF CAZENOVIA, NEW YORK.

IMPROVEMENT IN CORN-PLANTERS.

Specification forming part of Letters Patent No. 47,614, dated May 9, 1865.

*To all whom it may concern:*

Be it known that I, WILLIAM H. BOYLE, of Cazenovia, in the county of Madison and State of New York, have invented a new and Improved Corn-Planter; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x$ $x$, Fig. 2; Fig. 2, a transverse vertical section of the same, taken in the line $y$ $y$, Fig. 1.

Similar letters of reference indicate corresponding parts.

This invention relates to a new and improved device for planting corn in hills and in check-rows; and it consists in the employment or use of two slides in connection with a drop-bar operated through the medium of its own gravity, or a spring and a wiper wheel or cam driven from one or both wheels of the machine, all being arranged as hereinafter fully shown and described, whereby the corn may be dropped at equal distances apart with certainty and precision.

A represents a rectangular frame, which is mounted on two wheels, B B, and is supported at its front end by a caster-wheel, C. On the frame A there are two hoppers, D D, one at each side, and in these hoppers the outer parts of two slides, E E, work. These slides are fitted in recesses or grooves $a$ $a$ at the rear of the axle F, and a spring, $b$, bears against the outer end of each slide, said springs having a tendency to keep shoulders or projections $c$ at the outer ends of the slides underneath holes $d$ in the hoppers D D, as will be fully understood by referring to Fig. 2. The inner ends of the slides E E are rounded, as shown at $e$ $e$ in Fig. 2, and G is a vertical slide which is fitted in a guide, H, secured in the framing directly back of the axle F. This slide G has a pendent block, I, secured in it by a pivot, $f$, as shown clearly in Fig. 1, and the guide H has an opening, $g$, made in its rear side, the object of which will be presently shown. At the rear of the axle F there are two tubes, J J, which communicate with the hoppers D D when the holes $d$ in the bottoms of the same are open by means of passages $h$ $h$. One of these tubes is shown in Fig. 2. The slide G has a pin, K, projecting horizontally from its front side, as shown in Fig. 1, and on the frame A in front of the wheels B B there is a shaft, H', on which a wheel, L, is placed, having an arm, $i$, projecting from it. This wheel, commonly termed a "wiper-wheel," actuates or raises the slide G, in consequence of the arm $i$ catching under the pin K. The shaft H may be operated by belts or gearing from one or both of the wheels B B. The slide G descends by its own gravity or by means of a spring each time the arm $i$ of wheel L passes it, and in the descent of said slide the block I comes in contact with the inner rounded ends of the slides E E and forces them outward, so that the shoulders or projections $c$ will be from underneath the holes $d$ and the seed allowed to escape from the hoppers through said holes down the passages $h$ $h$ into the tubes J, which conduct the seed to the earth. When the slide G passes below the rounded ends of the slides E E the lower end of block I strikes a beveled portion, $j$, of the axle and is forced back, the opening $g$ in the guide H admitting of that result. When the slide ascends under the action of the wiper-wheel the block I does not act upon the slides E E. The springs $b$ force the shoulders or projections $c$ instantly under the holes $d$ in the hoppers after the block I has ceased to act upon the slides E. The whole arrangement is extremely simple and efficient, and possesses the advantage of operating quickly, so as to insure the corn being dropped at the proper places.

The shaft H may be rotated more or less rapidly according to the distance it may be required to plant the seed apart.

Having thus described my invention, I claim as new and desire to secure by Letters Patent—

The two slides E E, provided with the shoulders or projections $c$ and acted upon by the springs $b$, in connection with the drop composed of the pivoted block I in the slide G, acted upon by the wheel L, provided with an arm, $i$, and all arranged to operate in the manner substantially as and for the purpose set forth.

W. H. BOYLE.

Witnesses:
  M. M. LIVINGSTON,
  WM. DEAN OVEREL.